United States Patent [19]

Yoshino

[11] Patent Number: 5,424,538
[45] Date of Patent: Jun. 13, 1995

[54] SCANNING OPTICAL SYSTEM HAVING FIRST AND SECOND KNIFE EDGE DETECTORS AND FIRST AND SECOND RISE TIME DETECTION CIRCUITS

[75] Inventor: Kazuhiro Yoshino, Saitama, Japan

[73] Assignee: Fuji Xerox Co., Ltd., Tokyo, Japan

[21] Appl. No.: 191,479

[22] Filed: Feb. 4, 1994

[30] Foreign Application Priority Data

Feb. 10, 1993 [JP] Japan ................................. 5-044380
Feb. 10, 1993 [JP] Japan ................................. 5-044381

[51] Int. Cl.⁶ ............................................. G02B 26/10
[52] U.S. Cl. .................................. 250/235; 356/121
[58] Field of Search ............ 250/235, 234, 236, 201.2, 250/201.5, 201.7, 201.8, 206.1, 208.2; 356/121, 122, 400, 141.4, 141.2; 369/44.28, 44.29, 44.32

[56] References Cited

U.S. PATENT DOCUMENTS 5,064,284 11/1991 Johnston, Jr. et al. .............. 356/121
5,253,239 10/1993 Edahiro et al. .................... 356/44.28
5,267,012 11/1993 Sasnett et al. ........................ 356/121

FOREIGN PATENT DOCUMENTS 61-10769 3/1986 Japan .
1-237614 9/1989 Japan .

Primary Examiner—David C. Nelms
Assistant Examiner—John R. Lee
Attorney, Agent, or Firm—Finnegan, Henderson, Farabow, Garrett & Dunner

[57] ABSTRACT

In a scanning optical system, a first light detecting body is disposed so as to be coplanar with a surface to be scanned, whereas a second light detecting body is disposed in front of the surface to be scanned. Outputs of the light detecting bodies are applied to a first rise time detecting circuit and a second rise time detecting circuit to detect rise times, respectively. The rise times are applied to a comparing circuit, which compares a difference therebetween to detect a displacement of a beam of light that is scanning the surface to be scanned from the focus. A control circuit outputs a signal for correcting the displacement from the focus. Simultaneously therewith, a spot judging circuit detects the profile of a spot of the beam of light that is scanning the surface to be scanned from the rise time.

5 Claims, 8 Drawing Sheets

SCANNING OPTICAL SYSTEM HAVING FIRST AND SECOND KNIFE EDGE DETECTORS AND FIRST AND SECOND RISE TIME DETECTION CIRCUITS

BACKGROUND OF THE INVENTION

1. Field of the Invention

The present invention relates to scanning optical systems, and more particularly to a scanning optical system that not only corrects displacement of a position at which a beam of light scanning a surface to be scanned converges, but also has a light converging position detector for detecting the profile of the beam of light on the surface to be scanned.

2. Discussion of the Related Art

In scanning optical systems for recording images by scanning a recording medium, which is a surface to be scanned, with a beam of light, the light converging position (i.e., the beam waist position) must be located on the surface to be scanned with extremely high accuracy.

Further, scanning optical systems for use in laser printers and the like address the following problems. Even if the light beam converging position has been adjusted with high accuracy, changes in ambient temperature during the operation of the optical system not only cause optical parts constituting the scanning optical system and the surface plate carrying the optical parts to expand and contract, but also cause the indices of refraction of the optical parts to fluctuate, thereby displacing the light converging position from the surface to be scanned.

When the light converging position is displaced from the surface to be scanned, the diameter of a spot of the light beam irradiated onto the surface to be scanned is varied from a desired value, and as a result, the quality of the recorded image is impaired. Hence, the light source or the optical system must be moved in the direction of the optical axis so that the light beam converging position can be maintained on the surface to be scanned at all times even after the light converging position of the optical system has once been adjusted. To implement this, displacements of the light converging position from the surface to be scanned must be detected sequentially.

Disclosed as a solution to this problem are, e.g., Japanese Patent Unexamined Publication Nos. Sho 61-10769 and Hei 1-237614.

The publication No. Sho 61-10769 is designed to detect the profile of a spotlight by arranging a single light detector on a surface to be scanned and an image rotator for rotating the spotlight. The light detector is constituted by a knife edge.

The publication No. Hei 1-237614 is designed to detect a displacement of the light beam converging position on a surface to be scanned by arranging light detectors in front and at the back of the surface to be scanned, each light detector being constituted by a slit whose width is narrower than that of the light beam that is scanning the surface to be scanned.

However, the first conventional art is not designed to detect in which direction the light beam converging position is displaced when the light beam that is scanning the surface to be scanned becomes abnormal. Thus, the light beam converging position must be adjusted while the direction of the displacement is being traced, which makes the adjustment time-consuming.

Further, the second conventional art leaves the slits clogged by foreign matter such as dirt and dust since the slits are narrower than the diameter of the beam of light, which thus prevents the diameter of the spot of the light beam from being detected stably.

Still further, the second conventional art is not designed to detect an actual profile of the light beam on the surface to be scanned although it can detect in which direction, front or back, the light beam converging position is displaced and thus can effect such control as to cause the light converging position to near the surface to be scanned. However, there exists the problem that the actual profile of the light beam on the surface to be scanned cannot be detected.

SUMMARY OF THE INVENTION

The invention has been made to eliminate the above-mentioned problems with the conventional arts. Accordingly, an object of the invention is to provide a scanning optical system having a simple and highly reliable light converging position detector that can correct displacement of a light beam converging position from the surface to be scanned.

Another object of the invention is to provide a scanning optical system having a simple and highly reliable light converging position detector that can correct displacement of a light beam converging position from the surface to be scanned and detect the profile of a spot of a beam of light that is scanning the surface to be scanned simultaneously.

To achieve the above objects, a first aspect of the invention is applied to a scanning optical system for scanning a beam of light in a main scanning direction by converging the beam of light on a surface to be scanned, the scanning optical system including: a first light detecting body and a second light detecting body, disposed at positions in front and at the back of a position optically equivalent to the surface to be scanned, for receiving as inputs thereof the beam of light cut by knife edges, the positions being remote from the surface to be scanned by distances substantially equal to a depth of focus, respectively; a first rise time detecting circuit and a second rise time detecting circuit for detecting rise times from output signals from the first and the second light detecting bodies, respectively; a means for detecting a direction of displacement of a light beam converging position by comparing outputs from the first and the second rise time detecting circuits; and a means for correcting the displacement of the light beam converging position.

To achieve the above objects, a second aspect of the invention is applied to the scanning optical system according to the first aspect of the invention, which further includes: an OK-NG judging means for judging whether or not a displacement of the light beam converging position is within an allowable range based on the outputs from the first and the second rise time detecting circuits and correcting the displacement of the light beam converging position when the displacement is not within the allowable range.

To achieve the above objects, a third aspect of the invention is applied to a scanning optical system for scanning a beam of light in a main scanning direction by converging the beam of light on a surface to be scanned, the scanning optical system including: a first light detecting body, disposed at a position optically equivalent to the surface to be scanned, for receiving the beam of light cut by a knife edge; a second light detecting body, disposed at a position either in front or at the back of the surface to be scanned, for receiving the beam of light cut by a knife edge; a first rise time detecting circuit and a second rise time detecting circuit for detecting rise times from output signals from the first and the second light detecting bodies; a means for correcting a displacement of a light beam converging position from the surface to be scanned based on outputs from the first and the second light detecting bodies; and a means for detecting a profile of the beam of light on the surface to be scanned from the output of the first rise time detecting circuit.

According to the invention, the diameter of the spot of the beam of light located at a position as remote from the surface to be scanned as a distance substantially equal to the depth of focus can be calculated. Therefore, the direction in which the light beam converging position is displaced can be detected by comparing the calculated diameter with a reference value.

In this case, since the diameter of the spot of the beam of light is calculated based on the rise time of the beam of light cut by the knife edges, the diameter of the spot can be found with ease as well as free from the influence of dirt, dust, or the like.

According to the invention, the rise times outputted from the first and the second light detecting bodies are compared. Therefore, the displacement of the light beam converging position from the surface to be scanned can be corrected automatically. Simultaneously therewith, the diameter or profile of the beam of light on the surface to be scanned can be detected by the rise time from the first light detecting body disposed on the surface to be scanned.

BRIEF DESCRIPTION OF THE DRAWINGS

The above and other objects and features of the present invention will be more apparent from the following description taken in conjunction with the accompanying drawings.

DETAILED DESCRIPTION OF THE PREFERRED EMBODIMENTS

The invention will now be described in detail with reference to the drawings.

Figure 1:
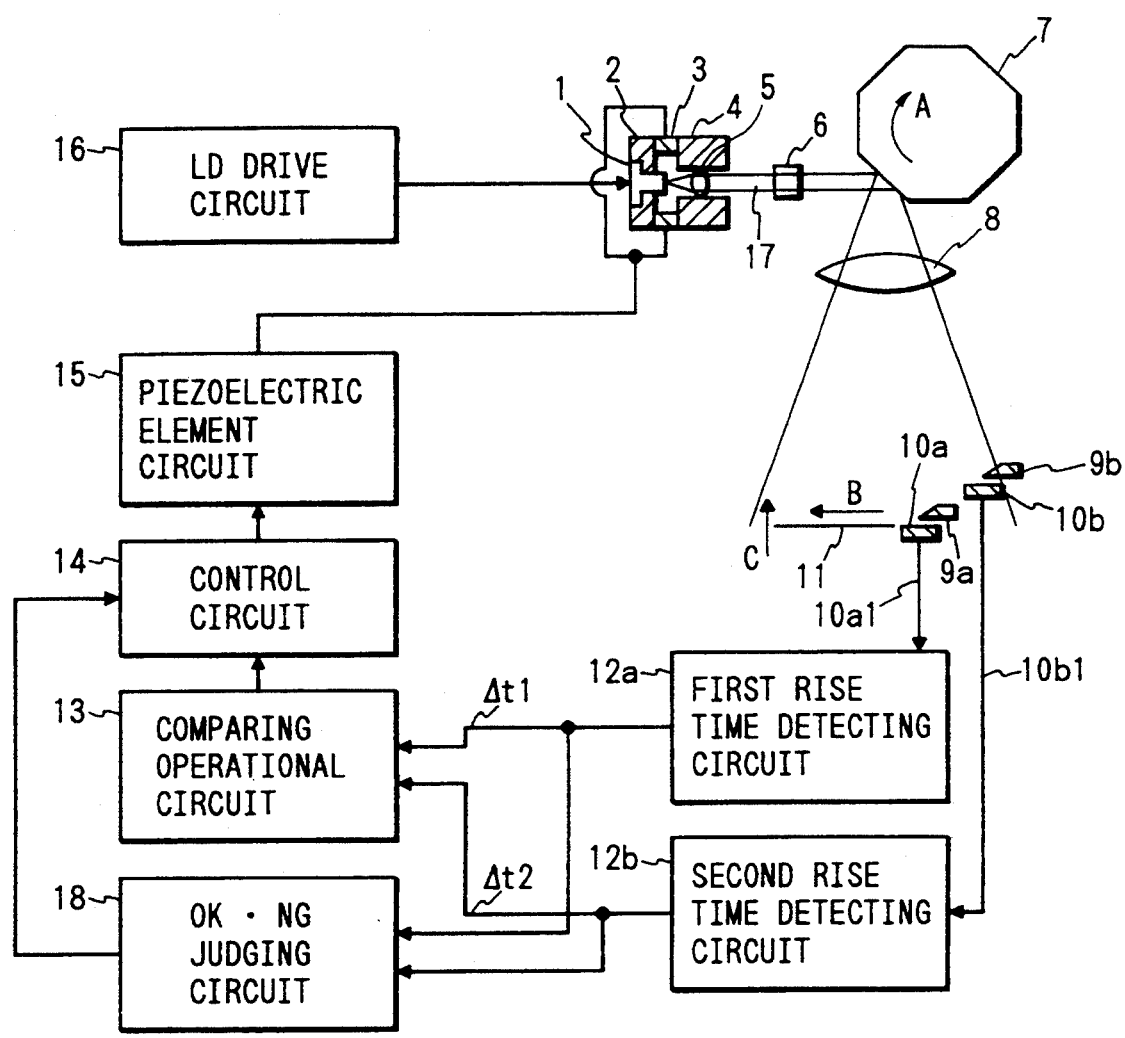
FIG. 1 is a schematic diagram showing a configuration according to a first embodiment of the invention.

FIG. 1 is a schematic diagram showing a configuration of a scanning optical system, which is a first embodiment of the invention.

In FIG. 1, reference numeral 1 designates a semiconductor laser for injecting a laser beam; 2, a semiconductor laser fixing member; 3, a piezoelectric element for adjusting the semiconductor laser 1 in the direction of the optical axis; 4, a collimator lens fixing member; and 5, a collimator lens for producing parallel rays out of the laser beam.

Reference numeral 6 designates a cylinder lens; 7, a rotary polygon mirror for deflecting the laser beam in a main scanning direction; 8, an fθ lens; 11, a recording medium, which is a surface to be scanned; 9a, 9b, knife edges; 10a, 10b, light detecting bodies; 12a, 12b, a first rise time detecting circuit and a second rise time detecting circuit for detecting rise times of the outputs of the light detecting bodies 10a, 10b, respectively.

Further, reference numeral 13 designates a comparing operational circuit for finding the direction of displacement of the light beam converging position from a difference between the outputs of the first and the second rise time detecting circuits 12a, 12b; 14, a control circuit for outputting a control signal based on the output of the comparing operational circuit 13; 15, a piezoelectric element drive circuit for driving the piezoelectric element 3 in response to the control signal; 16, an LD drive circuit for modulating the laser beam injected from the semiconductor laser 1; 17, a beam of light, 18, an OK·NG judging circuit for judging whether or not the diameter of a spot of light that is scanning the recording medium 11 is within an allowable range and for instructing the control circuit 14 to activate control.

Reference character A designates a direction of rotation of the rotary polygon mirror 7; B, the main scanning direction of a beam of light; C, the direction of displacement of the light converging position of the beam of light; 10al, 10b, output signals of the light detecting bodies 10a, 10b, respectively; and Δt1, Δt2, rise times, which are outputs of the first and the second rise time detecting circuits 12a, 12b.

Figure 2:
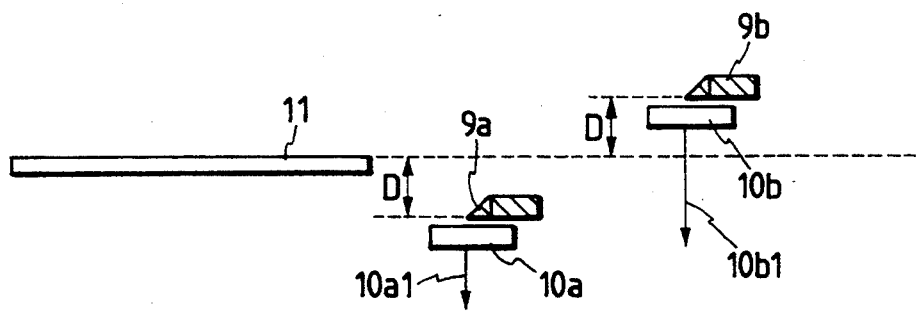
FIG. 2 is a diagram illustrative of light detecting bodies of FIG. 1 in enlarged form.

FIG. 2 is a diagram showing a light converging position detector in enlarged form. In the first embodiment, a first light converging position detecting section including the knife edge 9a and the light detecting body 10a is disposed at a position remote from the back surface of the recording medium 11, which is the surface to be scanned, by a distance D, whereas a second light converging position detecting section including the knife edge 9b and the light detecting body 10b is disposed at a position remote from the front surface of the recording medium 11 by a distance D. It is preferable to set the distance D to a value exactly or substantially equal to a depth of focus of a beam of light to be injected onto the surface to be scanned.

Figure 3:
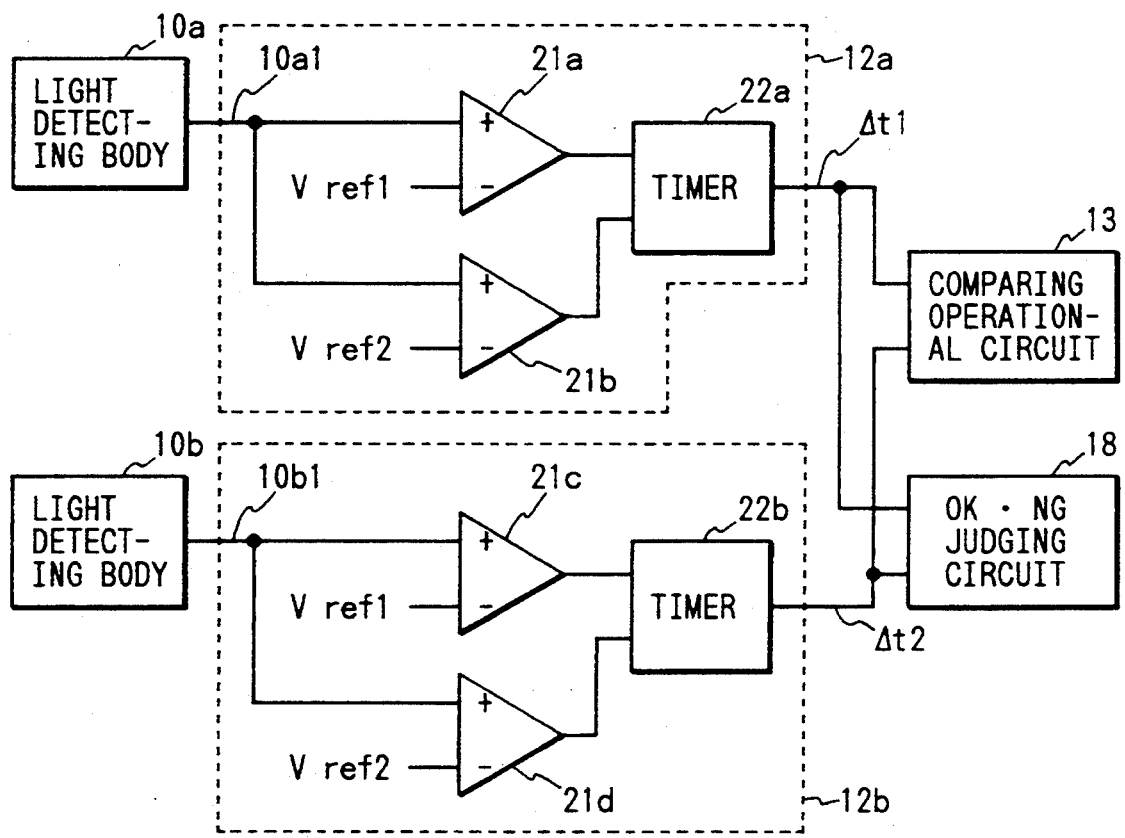
FIG. 3 is a circuit diagram showing specific examples of rise time detecting circuits of FIG. 1.

Specific examples of the first and the second rise time detecting circuits 12a, 12b will be described next with reference to FIG. 3. In FIG. 3, the same reference characters designate the same or like parts and components as those of FIG. 1.

The first rise time detecting circuit 12a includes: a first comparator 21a, a second comparator 21b, and a timer 22a. The second rise time detecting circuit 12b includes a third comparator 21c, a fourth comparator 21d, and a timer 22b.

The first and the third comparators 21a, 21c compare input signals from the light detecting bodies 10a, 10b with a first reference Vref1, and output H-level signals when the input signals exceed the first reference Vref1. The timers 22a, 22b start counting times when the outputs of the comparators 21a, 21c go high.

The second and the fourth comparators 21b, 21d compare input signals from the light detecting bodies 10a, 10b with a second reference Vref2, and output H-level signals when the input signals exceed the second reference Vref2. The timers 22a, 22b stop counting the times when the outputs of the comparators 21b, 21d go high. Outputs of the timers 22a, 22b are applied to the comparing operational circuit 13 and the OK·NG judging circuit 18.

Figure 4:
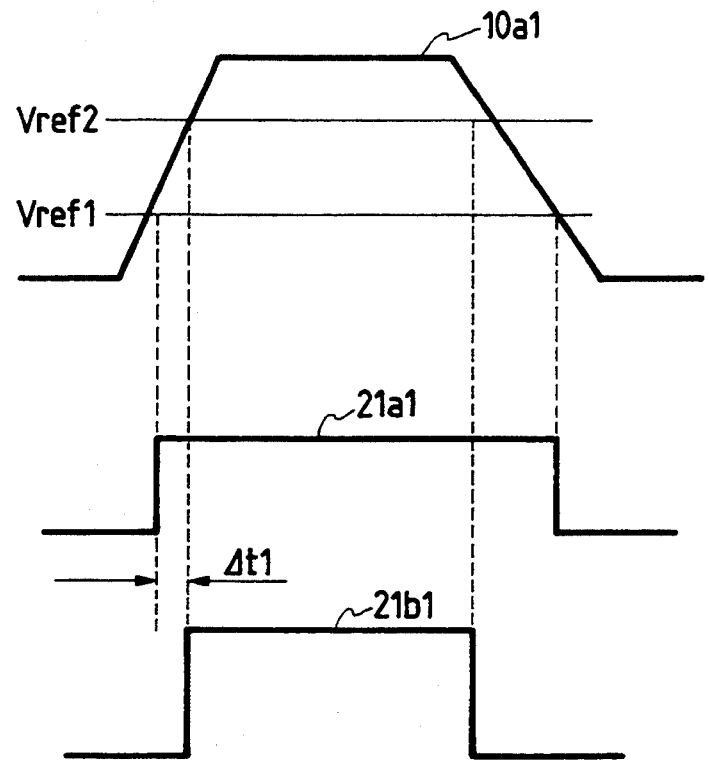
FIG. 4 is a diagram showing waveforms of main signals.

FIG. 4 is a diagram showing waveforms of main signals of the circuits shown in FIG. 3. When a signal having a waveform 10al has been applied from the light detecting body 10a, this signal is compared with Vref1 and Vref2 by the first and the second comparators 21a, 21b, and a signal having a waveform 21al and a signal having a waveform 21bl are outputted from the first comparator 21a and the second comparator 21b, respectively. The timer 22a detects a time Δt1 between the rise of the waveform 21al and the rise of the waveform 21bl.

Figure 5:
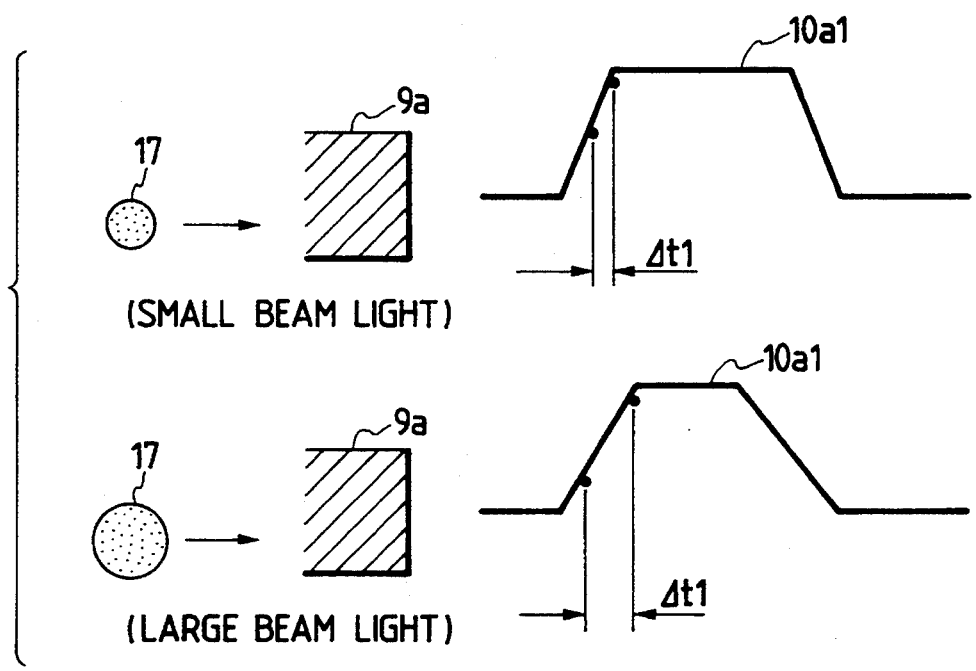
FIG. 5 is a diagram indicating that the rise time depends on the size of a spot of a beam of light.

This time Δt1 depends on the diameter of a spot of the light beam that is passing through the light detecting body 10a. That is, as shown in FIG. 5, a small spot diameter of the light beam 17 makes the rise of the waveform 10al steep, thereby shortening the time Δt1, whereas a large spot diameter makes the rise of the waveform 10al mild, thereby prolonging the time Δt1.

An operation of the first embodiment shown in FIG. 1 will be described in detail next.

The beam of light 17 modulated by the LD drive circuit 16 strikes onto the rotary polygon mirror 7 via the collimator lens 5 and the cylinder lens 6. Since the rotary polygon mirror 7 is being rotated in the direction of the arrow A at a constant speed, the beam of light 17 scans the recording medium 11 in the direction of the arrow B. At this time, the beam of light 17 scans the recording medium 11 at a constant speed in the main scanning direction (in the direction of B) by the action of the fθ lens 8.

Since the recording medium 11 is also being rotated at a constant speed in a direction at right angels to the direction of the arrow B, the beam of light 17 scans the recording medium 11 in the auxiliary direction as well.

The beam of light 17 is inputted to the light detecting bodies 10b, 10a before scanning the recording medium 11. The detection signals 10al, 10bl of the beam of light outputted from the light detecting bodies 10a, 10b are applied to the first and the second rise time detecting circuits 12a, 12b to detect the rise times thereof, respectively.

The rise times Δt1, Δt2 detected by the first and the second rise time detecting circuits 12a, 12b are delivered to the comparing operational circuit 13 and the OK·NG judging circuit 18. The comparing operational circuit 13 compares the rise times Δt1, Δt2 and judges in which direction, whether up or down, and how much the light converging position is displaced on the recording medium 11.

Figure 6:
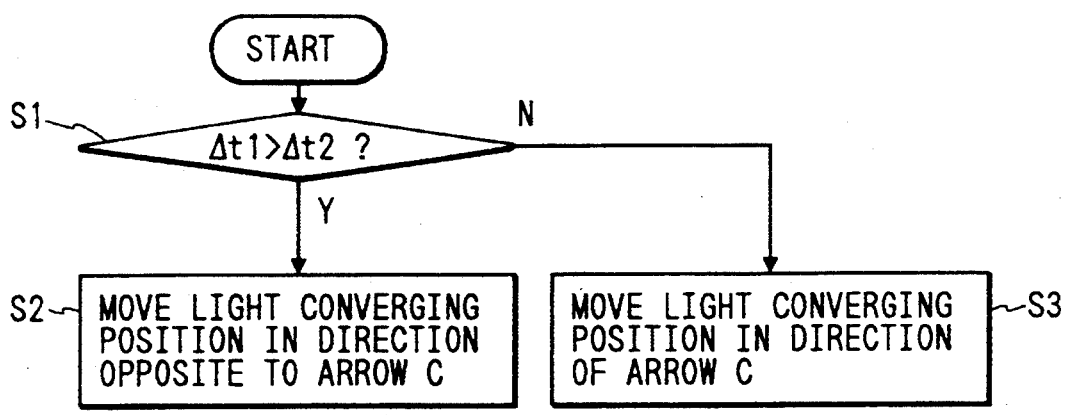
FIG. 6 is a flowchart showing an exemplary operation of a comparing circuit.

That is, as shown in FIG. 6, the comparing operational circuit 13 judges whether or not Δt1>Δt2 is established in Step S1. If the result of the judgment is affirmative, an instruction for moving the light converging position in a direction opposite to the arrow C is given in Step S2. If, on the other hand, Δt1>Δt2 is not established, an instruction for moving the light converging position in the direction of the arrow C is given in Step S3. The signal outputted from the comparing operational circuit 13 is fed to the control circuit 14.

Figure 7:
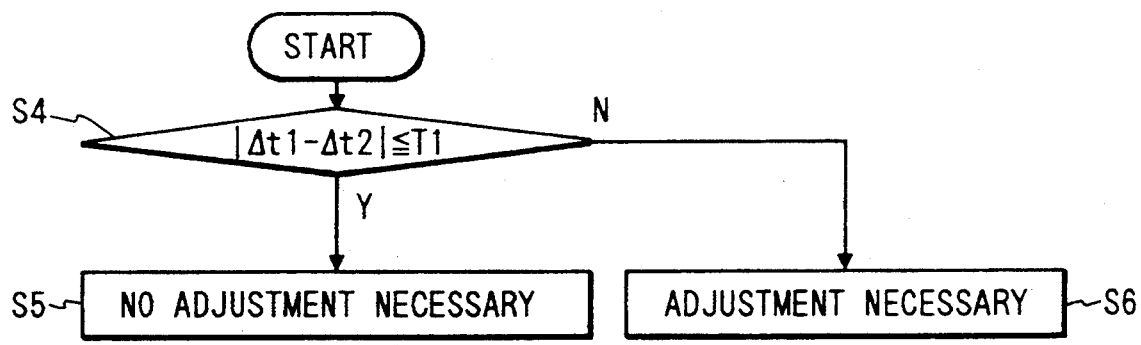
FIG. 7 is a flowchart showing an exemplary operation of an OK·NG judging circuit.

As shown in FIG. 7, the OK·NG judging circuit 18 judges whether or not the absolute value of the difference between the rise times Δt1 and Δt2 is equal to or smaller than a predetermined reference T1 in Step S4. If the result of the judgment is affirmative, the light converging position of the beam of light 17 is judged to be on the recording medium 11, so that a signal indicating that no adjustment is necessary is outputted in Step S5. On the other hand, if the result of the judgment is negative, a signal indicating that adjustment is necessary is outputted in Step S6.

Upon receipt of the signal indicating that adjustment is necessary from the OK·NG judging circuit 18, the control circuit 14 outputs a control signal for controlling the piezoelectric element drive circuit 15 based on the instruction from the comparing operational circuit 13. The piezoelectric element drive circuit 15 causes the semiconductor laser 1 or the collimator lens 5 to move in the direction of the optical axis in accordance with the control signal.

As described above, according to the first embodiment, even if the light converging position is displaced in the direction of the arrow C or in the direction opposite to the arrow C due to the beam of light 17 having been projected for a long time, the surface plate carrying the optical system having been expanded, or the index of refraction of the collimator lens 5 having been varied, the light converging position of the beam of light 17 is detected sequentially, thereby allowing the light converging position of the optical system to be corrected with high accuracy.

Figure 8:
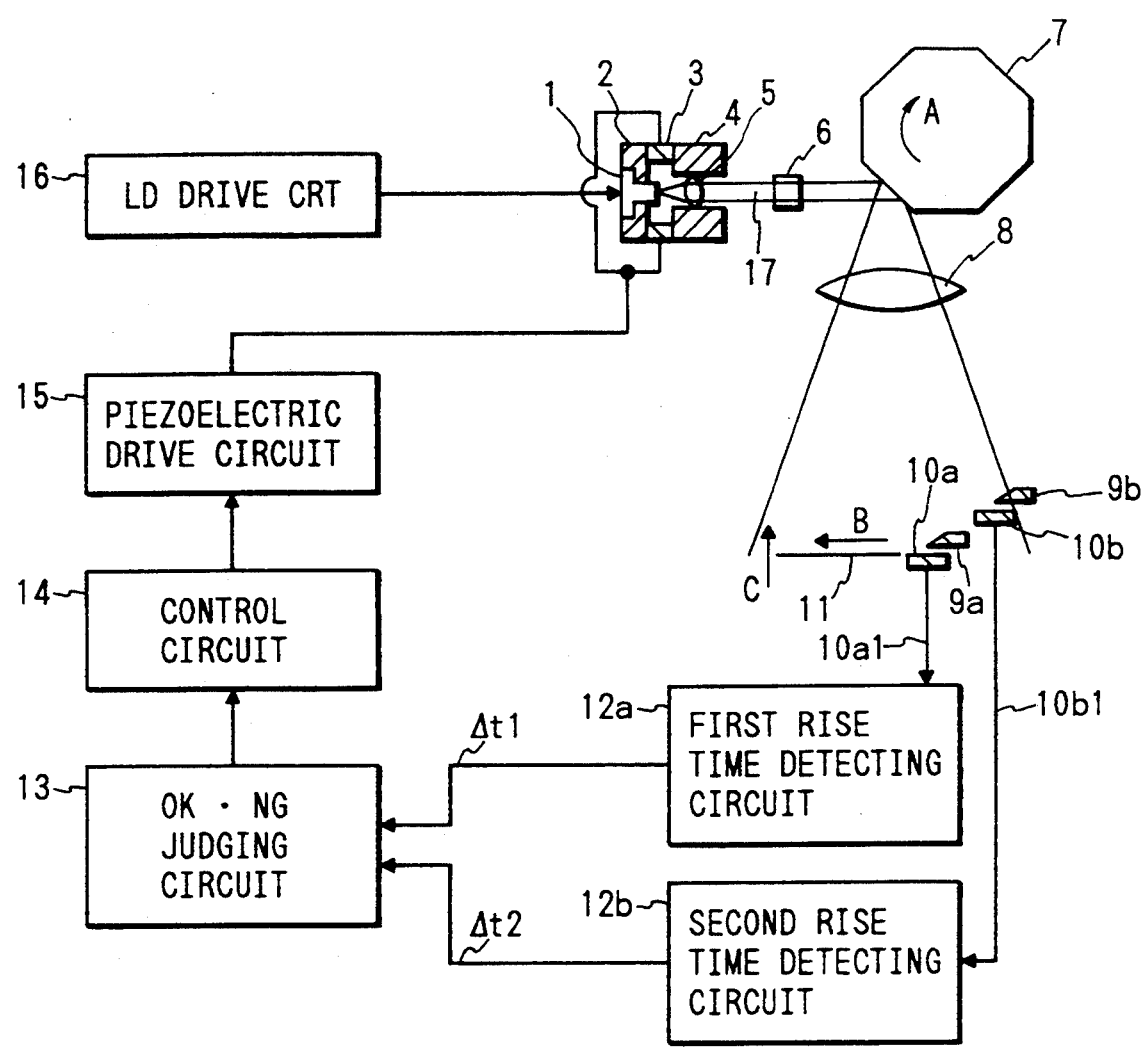
FIG. 8 is a schematic diagram showing a configuration according to a second embodiment of the invention.
Figure 9:
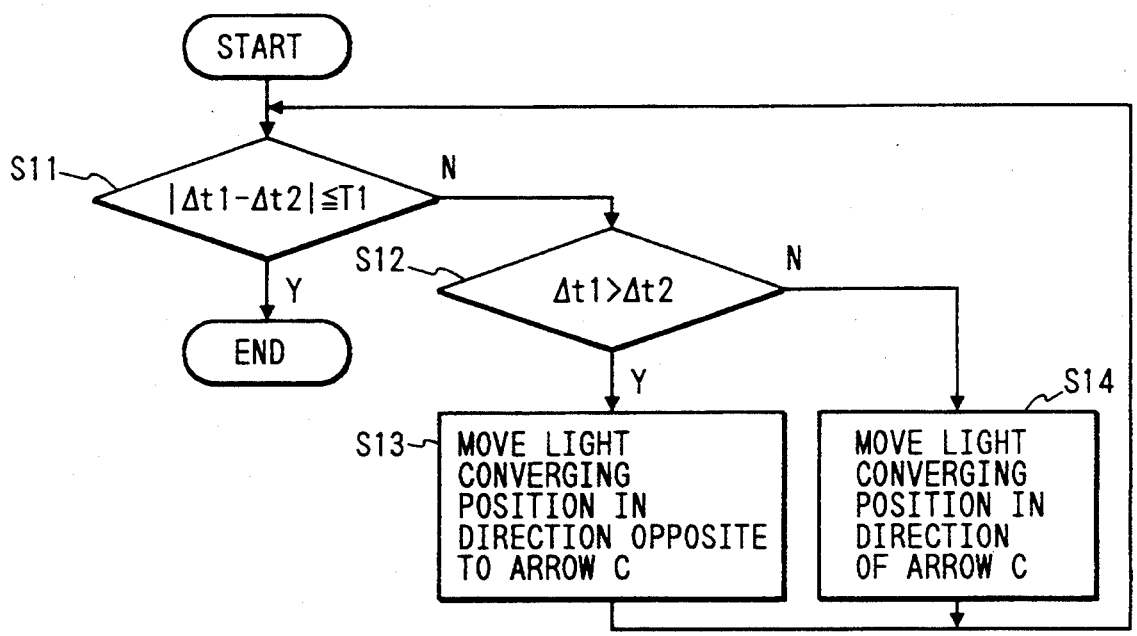
FIG. 9 is a flowchart showing an exemplary operation of the comparing operational circuit of the second embodiment.

A second embodiment of the invention will be described with reference to FIG. 8. The second embodiment is distinguished from the first embodiment in that the second embodiment does not include the OK·NG judging circuit 18 and that such a function as shown in FIG. 9 is additionally given to the comparing operational circuit 13 of the second embodiment.

More specifically, the comparing operational circuit 13 judges whether or not the absolute value of the difference (Δt1–Δt2) is equal to or smaller than the predetermined reference T1 in Step S11. If the result of the judgment is affirmative, the operation is ended. On the other hand, if the result of the judgment is negative, whether or not Δt1>Δt2 is established is judged in Step S12. If the result of the judgment is affirmative, the instruction for moving the light converging position of the beam of light in the direction opposite to the arrow C is given in Step S13. If, on the other hand, the result of the judgment is negative, the instruction for moving the light converging position in the same direction of the arrow C is given in Step S14.

Upon receipt of the instruction from the comparing operational circuit 13, the control circuit 14 outputs the control signal to the piezoelectric element drive circuit 15 to cause the semiconductor laser 1 or the collimator lens 15 to move in the direction of the optical axis in accordance with the instruction.

Figure 10:
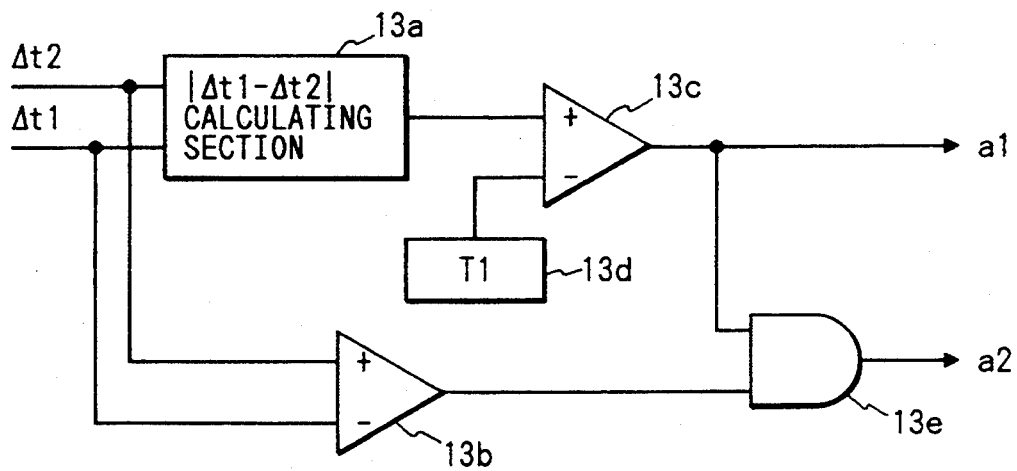
FIG. 10 is a circuit diagram showing a specific example of the comparing circuit according to the second embodiment.

An example of the comparing operational circuit 13 is shown in FIG. 10, in which reference character 13a designates an absolute value calculating section for calculating the absolute value of the difference ($\Delta t1 - \Delta t2$); 13b, 13c, comparators; 13d, the reference (=T1); and 13e, an AND circuit.

When the outputs (a1, a2) of the comparing operational circuit 13 are (1, 0), the control circuit 14 judges that the instruction according to Step S13 has been given. If the outputs are (1, 1), the control circuit 14 judges that the instruction according to Step S14 has been given. If the outputs are (0, 0), the control circuit 14 judges that the light converging position of the beam of light 17 is on the recording medium 11.

The second embodiment may provide advantages similar to those of the first embodiment.

Figure 11:
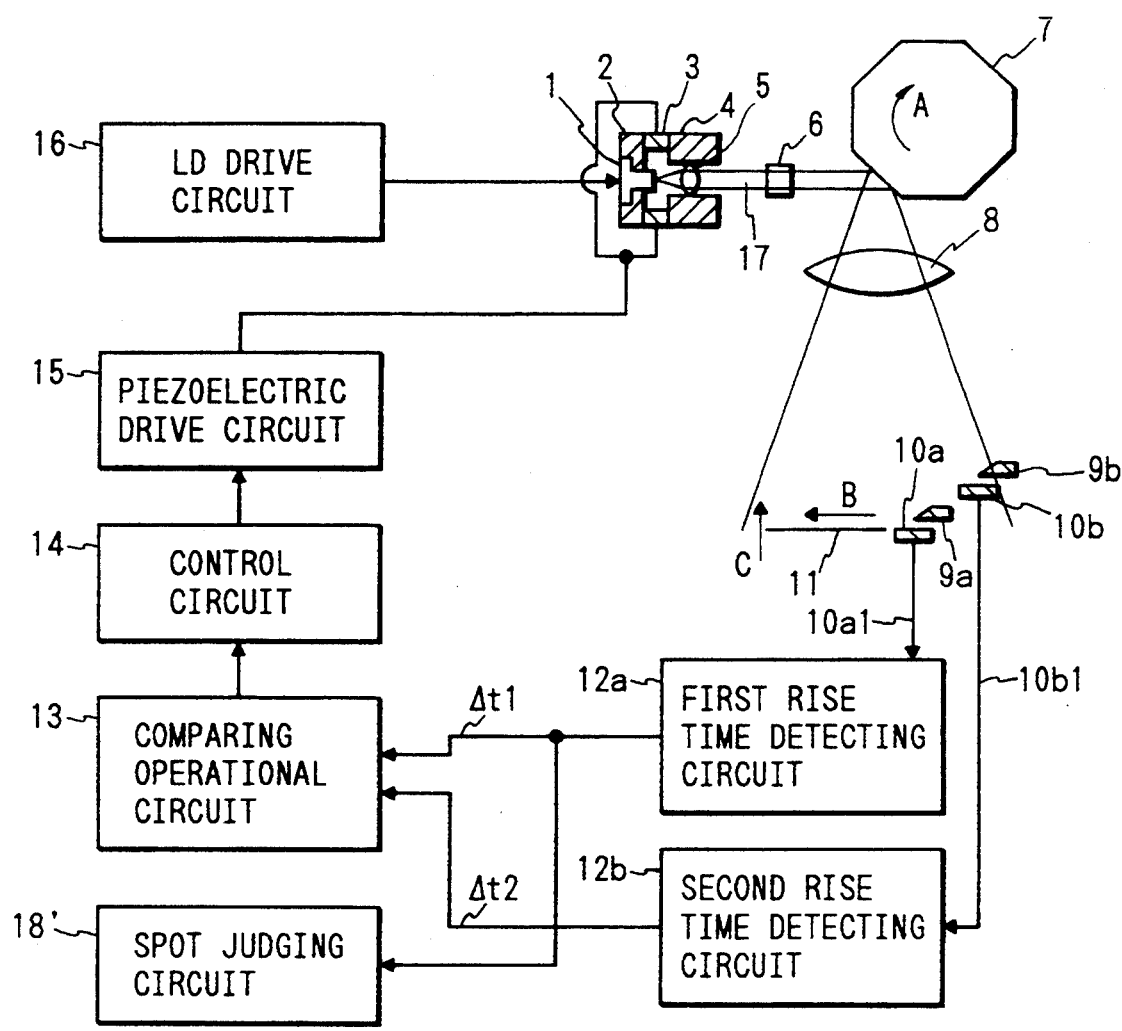
FIG. 11 is a schematic diagram showing a configuration according to a third embodiment of the invention.

A third embodiment of the invention will be described next with reference to FIG. 11. In FIG. 11, reference numeral 1 designates a semiconductor laser for injecting a laser beam; 2, a semiconductor laser fixing member; 3, a piezoelectric element for adjusting the semiconductor laser 1 in a direction of the optical axis; 4, a collimator lens fixing member; and 5, a collimator lens for producing parallel rays out of the laser beam.

Reference numeral 6 designates a cylinder lens; 7, a rotary polygon mirror for deflecting the laser beam in a main scanning direction; 8, an f$\theta$ lens; 11, a recording medium, which is a surface to be scanned; 9a, 9b, knife edges; 10a, 10b, light detecting bodies; 12a, 12b, a first rise time detecting circuit and a second rise time detecting circuit for detecting rise times of the outputs of the light detecting bodies 10a, 10b, respectively.

Further, reference numeral 13 designates a comparing operational circuit for finding the direction of displacement of the light converging position of a beam of light from a difference between the outputs of the first and the second rise time detecting circuits 12a, 12b; 14, a control circuit for outputting a control signal based on the output from the comparing operational circuit 13; 15, a piezoelectric element drive circuit for driving the piezoelectric element 3 in response to the control signal; 16, an LD drive circuit for modulating the laser beam injected from the semiconductor laser 1; 17, a beam of light, 18', a spot judging circuit for judging the profile of a spot of the beam of light for scanning the recording medium 11.

Reference character A designates a direction of rotation of the rotary polygon mirror 7; B, the main scanning direction of a beam of light; C, the direction of displacement of the light converging position of the beam of light; 10a1, 10b, output signals of the light detecting bodies 10a, 10b, respectively; and $\Delta t1$, $\Delta t2$, rise times, which are outputs of the first and the second rise time detecting circuits 12a, 12b.

Figure 12:
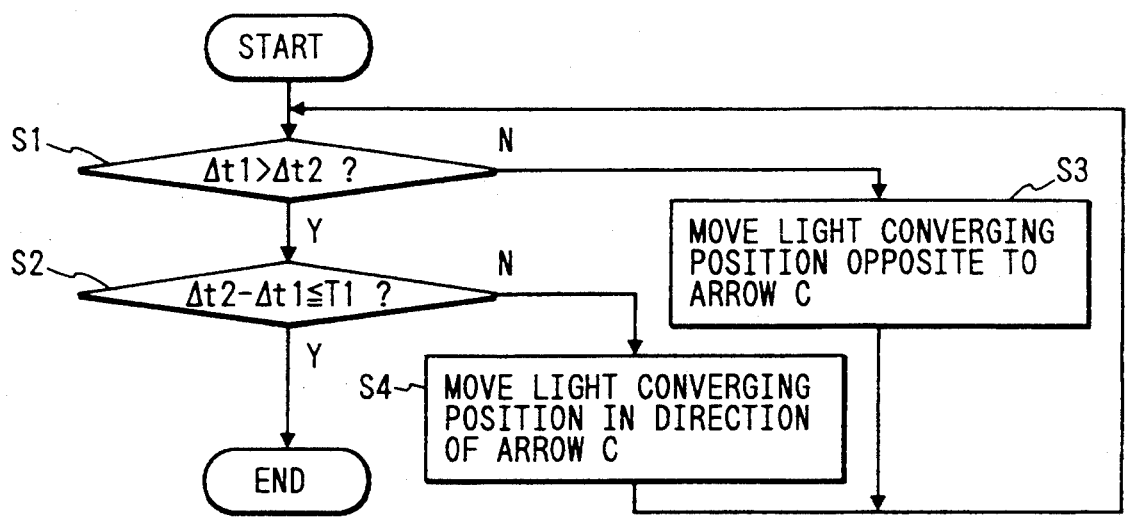
FIG. 12 is a flowchart showing an exemplary operation of the comparing operational circuit of a fourth embodiment of the invention.

FIG. 12 is a diagram showing a light converging position detector in enlarged form. In the third embodiment the light converging position detector includes: a first light converging position detecting section that has the knife edge 9a and the light detecting body 10a disposed on an extension of the recording medium 11, which is the surface to be scanned; and a second light converging position detecting section that has the knife edge 9b and the light detecting body 10b disposed at a position remote from the recording medium 11 by a distance D. It is preferable to set the distance D to a value exactly or substantially equal to a depth of focus of a beam of light to be injected onto the surface to be scanned.

An operation of the third embodiment shown in FIG. 11 will be described in detail next.

The beam of light 17 modulated by the LD drive circuit 16 strikes onto the rotary polygon mirror 7 via the collimator lens 5 and the cylinder lens 6. Since the rotary polygon mirror 7 is being rotated in the direction of the arrow A at a constant speed, the beam of light 17 scans the recording medium 11 in the direction of the arrow B. At this time, the beam of light 17 scans the recording medium 11 at a constant speed in the main scanning direction by the action of the f$\theta$ lens 8.

Since the recording medium 11 is also being rotated at a constant speed in the direction at right angels to the direction of the arrow B, the beam of light 17 scans the recording medium 11 in the auxiliary direction as well.

The beam of light 17 is inputted to the light detecting bodies 10b, 10a while cut by the knife edges 9b, 9a before scanning the recording medium 11. The detection signals 10a1, 10b1 of the beam of light outputted from the light detecting bodies 10a, 10b are applied to the first and the second rise time detecting circuits 12a, 12b to detect the rise times thereof, respectively.

The rise time $\Delta t1$ detected by the first rise time detecting circuit 12a is delivered to the comparing operational circuit 13 and the spot judging circuit 18', whereas the rise time $\Delta t2$ detected by the second rise time detecting circuit 12b is delivered to the comparing operational circuit 13.

The comparing operational circuit 13 calculates the difference between the rise times $\Delta t1$ and $\Delta t2$, and outputs the calculated result to the control circuit 14. The control circuit 14 outputs a control signal to the piezoelectric element drive circuit 15, the control signal being a correction signal corresponding to a displacement, which is the calculated result. The piezoelectric element drive circuit 15 causes the semiconductor laser 1 or the collimator lens 5 to move in the direction of the optical axis in accordance with the control signal.

The rise time $\Delta t1$ detected by the first rise time detecting circuit 12a is fed to the spot judging circuit 18'. The spot judging circuit 18' provides information as to the profile of a spot of the beam of light that is scanning the recording medium 11. Accordingly, the profile of the spot of the beam of light can be monitored or whether or not the diameter of the spot is as desired can be judged.

The control circuit 14 may be operated so as to be turned on and off based on the judgment result of the diameter of the light beam spot. The control circuit 14 may also be operated in such a manner that the diameter of the light beam spot can be adjusted automatically by normally operating only the first rise time detecting circuit 12a to allow the diameter of the spot to be detected by the spot judging circuit 18', and operating the second rise time detecting circuit 12b when the detected diameter is larger than a predetermined value.

As described above, according to the third embodiment, even if the light converging position is displaced in the direction of the arrow C or in the direction opposite to the arrow C due to the beam of light 17 having been projected for a long time, the surface plate carrying the optical system having been expanded, or the index of refraction of the collimator lens 5 having been varied, the light converging position of the beam of light 17 is detected sequentially, thereby allowing the light converging position of the optical system to be corrected with high accuracy.

A fourth embodiment of the invention will be described. The fourth embodiment is distinguished from the third embodiment in that the comparing operational circuit 13 of the fourth embodiment has the function of judging in which direction and how much the light converging position of the beam of light 17 is displaced on the recording medium 11 by comparing the rise times $\Delta t1$ and $\Delta t2$.

More specifically, as shown in FIG. 12, the comparing operational circuit 13 judges whether or not the rise time $\Delta t1$ is smaller than the rise time $\Delta t2$ in Step S1. If the result of the judgment is affirmative, then the comparing operational circuit 13 judges whether or not the difference between $\Delta t1$ and $\Delta t2$ is equal to or smaller than the predetermined time difference T1 in Step S2. If the result of the judgment is affirmative, the light converging position of the beam of light 17 is judged to be on the recording medium 11.

However, if $\Delta t1 \geq \Delta t2$ (the result of the judgment is negative in Step S1), then the comparing operational circuit 13 judges that the light converging position should be moved in the direction opposite to the arrow C, thereby outputting a predetermined signal. If $\Delta t2 - \Delta t1 \leq T1$ is not established, the comparing operational circuit 13 judges that the light converging position should be moved in the direction of the arrow C, thereby outputting a predetermined signal.

Figure 13:
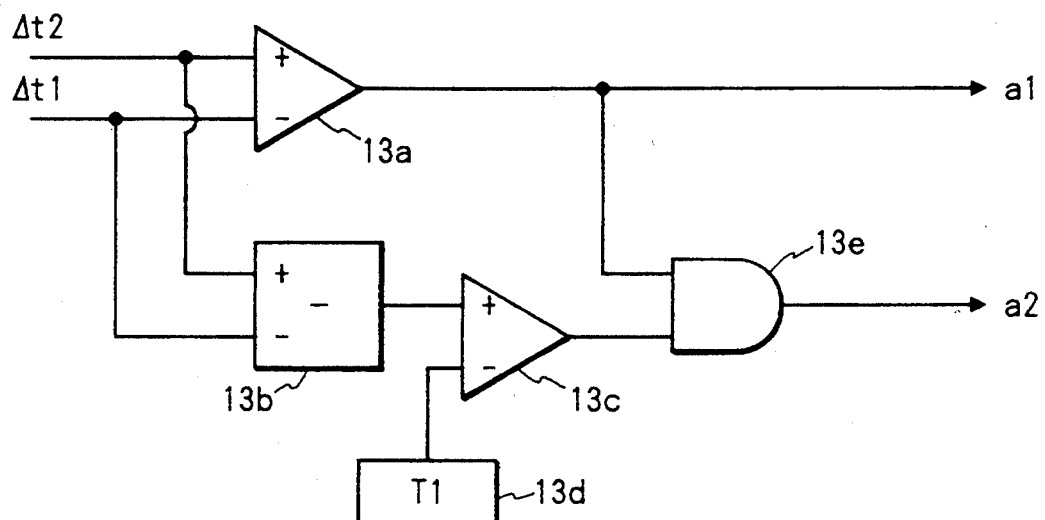
FIG. 13 is a diagram showing a specific example of the comparing circuit of the fourth embodiment.

FIG. 13 shows an example of the comparing operational circuit 13. In FIG. 13, reference characters 13a, 13c designate comparators; 13b, a subtracting circuit; and 13d, the reference T1. When the outputs of this circuit (a1, a2) are (0, 0), the result of the judgment in Step S1 is negative, thus causing the control circuit 14 to judge that the light converging position should be moved in the direction opposite to the arrow C. When the outputs are (1, 1), the result of the judgment in Step S1 is affirmative and the result of the judgment in Step S2 is negative, thus causing the control circuit 14 to judge that the light converging position should be moved in the direction of the arrow C. Further, when he outputs are (1, 0), the result of the judgment is affirmative in both Steps S1 and S2, thus causing the control circuit to judge that the beam of light is focused on the surface to be scanned.

The fourth embodiment may also provide advantages similar to those of the third embodiment.

While the light detecting body 10b is disposed in front of the recording medium 11 in both the third and the fourth embodiments, the embodiment of the invention is not limited thereto; the light detecting body 10b may also be disposed at the back of the recording medium 11.

As is apparent from the foregoing, the invention is characterized as adjusting the position of the semiconductor laser or the collimator lens in the direction of the optical axis by arranging the light detecting bodies both in front and at the back of the surface to be scanned and by comparing the rise times outputted from these two light detecting bodies. Therefore, displacement of the light converging position of a beam of light from the surface to be scanned can be corrected automatically.

Further, the invention is characterized as injecting a beam of light to the first and the second light detecting bodies with the beam of light cut by the knife edges. Therefore, a highly reliable scanning optical system free from the influence of dirt, dust, and the like can be provided.

Still further, the invention is characterized as adjusting the position of the semiconductor laser or the collimator lens in the direction of the optical axis by arranging the light detecting bodies in such a manner that one of the light detecting bodies is disposed on the surface to be scanned and the other is disposed either in front or at the back of the surface to be scanned and by comparing the rise times outputted from these two light detecting bodies. Therefore, displacement of the light converging position of a beam of light from the surface to be scanned can be corrected automatically. In addition, the profile of the beam of light on the surface to be scanned can be detected simultaneously therewith by the rise time from the light detecting body that is disposed on the surface to be scanned.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed:

1. A scanning optical system for scanning a beam of light in a main scanning direction by converging the beam of light on a surface to be scanned, comprising:
    a first light detecting body and a second light detecting body, disposed at positions in front and at the back of a position optically equivalent to the surface to be scanned, for receiving as inputs thereof the beam of light cut by knife edges, the positions being remote from the surface to be scanned by distances substantially equal to a depth of focus, respectively;
    a first rise time detecting circuit and a second rise time detecting circuit for detecting rise times from output signals from said first and said second light detecting bodies, respectively;
    means for detecting a direction of displacement of a light beam converging position by comparing outputs from said first and the second rise time detecting circuits; and
    means for correcting the displacement of the light beam converging position according to an output from said direction detecting means.

2. A scanning optical system according to claim 1, further comprising OK-NG judging means for judging whether or not a displacement of the light beam converging position is within an allowable range based on the outputs from said first and said second rise time detecting circuits to correct the displacement of the light beam converging position when the displacement is out of said allowable range.

3. A scanning optical system according to claim 1, wherein said correcting means comprising a piezoelectric element for adjusting the displacement of the light beam converging position and means for driving said piezoelectric element according to the output from said direction detecting means.

4. A scanning optical system for scanning a beam of light in a main scanning direction by converging the beam of light on a surface to be scanned, comprising:
- a first light detecting body, disposed at a position optically equivalent to the surface to be scanned, for receiving the beam of light cut by a knife edge;
- a second light detecting body, disposed at a position either in front or at the back of the surface to be scanned, for receiving the beam of light cut by a knife edge;
- a first rise time detecting circuit and a second rise time detecting circuit for detecting rise times from output signals from said first and said second light detecting bodies;
- means for correcting a displacement of a light beam converging position from the surface to be scanned based on outputs from said first and said second light detecting bodies; and
- means for detecting a profile of the beam of light on the surface to be scanned from the output of said first rise time detecting circuit.

5. A scanning optical system according to claim 4, wherein said correcting means comprising a piezoelectric element for adjusting the displacement of the light beam converging position and means for driving said piezoelectric element.

* * * * *